United States Patent
Fischer et al.

(10) Patent No.: US 7,147,205 B1
(45) Date of Patent: Dec. 12, 2006

(54) LOW ENERGY HIGH PRESSURE MINIATURE SCREW VALVE

(75) Inventors: Gary J. Fischer, Sandia Park, NM (US); Barry L. Spletzer, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 210 days.

(21) Appl. No.: 10/870,755

(22) Filed: Jun. 16, 2004

(51) Int. Cl.
*F16K 31/02* (2006.01)

(52) U.S. Cl. .................. 251/129.11; 251/331
(58) Field of Classification Search ........... 251/129.11, 251/129.12, 129.13, 331
See application file for complete search history.

(56) References Cited

U.S. PATENT DOCUMENTS 3,053,499 A * 9/1962 Jones .......................... 251/284
3,633,874 A * 1/1972 Veugelers, Jr. ............... 251/330
6,764,060 B1 * 7/2004 Fukano et al. ......... 251/129.12

* cited by examiner

*Primary Examiner*—Edward K. Look
*Assistant Examiner*—John K. Fristoe, Jr.
(74) *Attorney, Agent, or Firm*—Kerry Kampschmidt

(57) ABSTRACT

A low energy high pressure screw valve having a valve body having an upper portion and a lower portion, said lower portion of said valve body defining an inlet flow passage and an outlet flow passage traversing said valve body to a valve seat, said upper portion of said valve body defining a cavity at said valve seat, a diaphragm restricting flow between said upper portion of said valve body and said lower portion, said diaphragm capable of engaging said valve seat to restrict fluid communication between said inlet passage and said outlet passage, a plunger within said cavity supporting said diaphragm, said plunger being capable of engaging said diaphragm with said valve seat at said inlet and outlet fluid passages, said plunger being in point contact with a drive screw having threads engaged with opposing threads within said upper portion of said valve body such engagement allowing motion of said drive screw within said valve body.

15 Claims, 3 Drawing Sheets

LOW ENERGY HIGH PRESSURE MINIATURE SCREW VALVE

This invention was made with Government support under Contract DE-AC04-94AL85000 awarded by the U.S. Department of Energy. The Government has certain rights in the invention.

BACKGROUND OF THE INVENTION

This invention relates to the field of miniature diaphragm valves. More specifically this invention relates to the use of diaphragm valves having a plunger to direct the diaphragm into valve ports to control fluid flow. More specifically this invention relates the use of miniature diaphragm valves for high-pressure low energy applications.

Miniature valves for low pressures are known in the art. Such valves have utilized flexible diaphragms with plungers to seal communication from inlet and outlet ports in the valves. Holterman, U.S. Pat. No. 4,944,487 shows one such diaphragm valve, Kloehn et al. U.S. Pat. No. 6,685,165 shows another valve assembly having an adjusting diaphragm means.

Such diaphragm valves have utilized a plunger as a means for engaging a valve seat between inlet and output ports. The low-pressure application of these valves has not required a focus on the plunger dimension in relation to the diaphragm and fluid inlet port. Prior diaphragm valves required a spring or other biasing means to hold the valve closed. Opening the valve generally required the deflection of the diaphragm by a radial compression or physical connection to the plunger during retraction of the plunger.

Prior diaphragms valves have utilize a solenoid for operation of opening and closing the valve. Such valves generally bias the diaphragm to close the valve and require the utilization of energy for holding the valve open. Such biasing means can, of course, be reversed requiring energy to hold the valve closed.

The prior art has not address the need for a high pressure, low energy diaphragm valve capable of multiple repetitions of valve cycles.

SUMMARY OF THE INVENTION

One aspect of an embodiment of the present invention comprises a low energy high pressure screw valve requiring energy for operation of the valve, however not requiring energy to hold the valve in the open position or the closed position.

One aspect of an embodiment of the present invention comprised unique features allowing the valve to achieve control of high-pressure fluids with unprecedented small size, robustness, and low energy use.

One embodiment of the valve design of the present invention is based on the sealed membrane and flat seat area. The flat seat allows for very simple machining and finishing procedures to produce a high-quality valve. This also gives a very long potential leak path making the valve reliable and relatively easy to seal. The membrane limits the wetted surfaces to the valve seat and membrane materials only. Prototypes of the valve have been successfully operated after being subjected to high-g (200 g) conditions.

In one embodiment of this invention, the plunger contains the membrane so that a thin pliable material can handle very high pressures, much like an inner tube in a tire. The rounded nose at the end of the plunger greatly reduces the frictional torque during operation and eliminates significant shear stress in the membrane.

In one embodiment of the present inventions, a smooth interface on the port to seal surface may be more easily manufactured by utilizing this design.

DETAILED DESCRIPTION OF THE INVENTION

Valve Design

Figure 1:
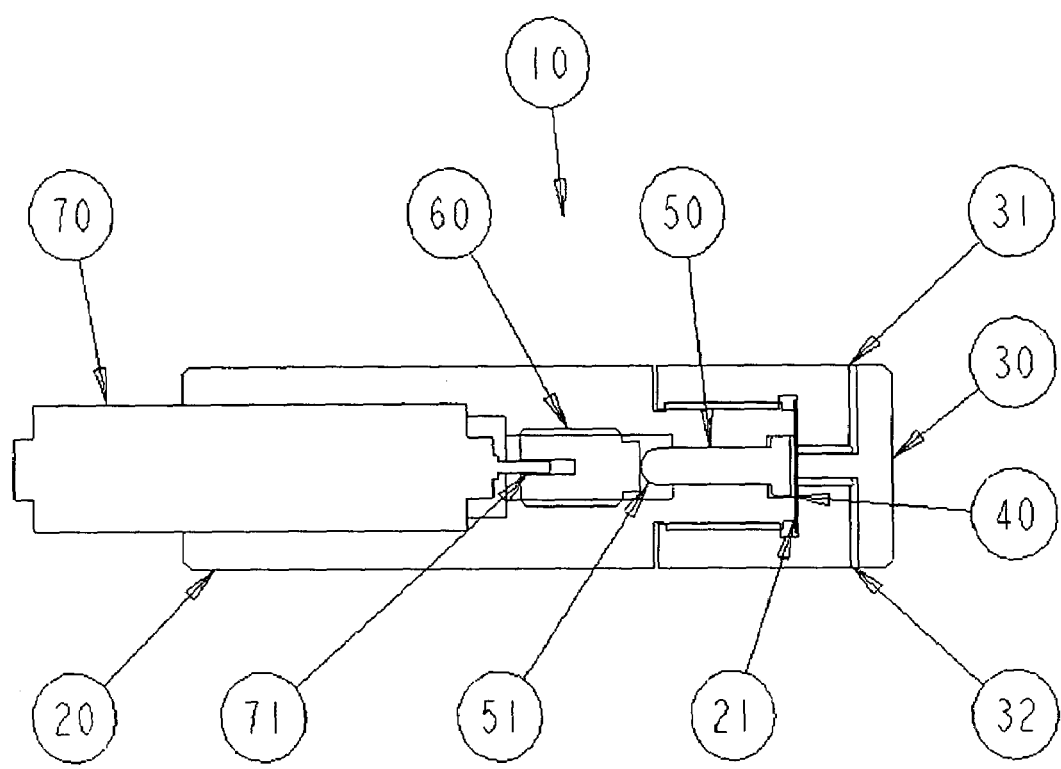
FIG. 1 is a representation of a cross section of an embodiment of a high pressure miniature screw valve.

Referring to FIG. 1, an embodiment of a control valve (10) is shown. The valve (10) shown in FIG. 1 is a screw valve utilizing a drive screw (60) powered by a motor (70). However, those skilled in the art will understand that a hydraulic actuator or any linear drive mechanism can be utilized to power drive screw (60). Specific embodiments of this screw valve (10) have demonstrated the ability to handle pressures of 750 psi. Embodiments of a valve (10) utilizing a drive screw (60) require minimum power so that several hundred operations can be performed on a single system battery.

The valve (10) utilizes a drive screw (60) mechanism. The drive screw (60) is in contact with a plunger (50). When the screw (60) engages the plunger (50) the plunger's face presses on and moves a flexible diaphragm membrane (40), which seals the input port (31), and output port (32) of the valve's lower portion (30). The surface around the lower valve portion (30) input port (31) and output port (32) is polished to a 16 surface finish or better for sealing with diaphragm (40).

The plunger (50), shown with a rounded surface (51) where it engages the screw (60), provides an essentially point contact between the screw (60) and the plunger (50). This point contact interface minimizes the amount of friction, reduces the required motor torque, and minimizes twisting on the membrane (40) surface that would otherwise occur with a direct screw (60)-to-membrane (40) contact. Those skilled in the art will understand that other torque reducing mechanisms could be used to reduce the contact surface area between plunger (50) and screw (60). Mechanisms for reducing the twisting on a surface such as spindles, ball bearings, and a variety of other devices are well known in the art and any such mechanism could be utilized for reducing the twisting on membrane (40). The embodiment of FIG. 1 is merely an illustrative example of a preferred embodiment of aspects of the present invention.

Fluid is prevented from traveling around the membrane (40) and into the internal workings of the valve (10) by means of a seating flange (21). The upper portion (20) of the valve (10) screws into the lower valve portion (30). A flange (21) feature firmly seats the diaphragm membrane (40) around its periphery. The inner workings i.e. plunger (50), plunger screw (60), and linear driving mechanism (70) are isolated from the pressurized fluid. Due to this isolation from the reactive valve (10) components and because any pliable material, including Teflon, nitrile rubber, or soft elastomeric material may be used for the sealing membrane (40), this valve (10) can be designed so that the only wetted surfaces are the membrane and valve body. The valve body may be constructed of a stainless steel, aluminum, plastic or any of a wide variety of materials.

Figure 2:
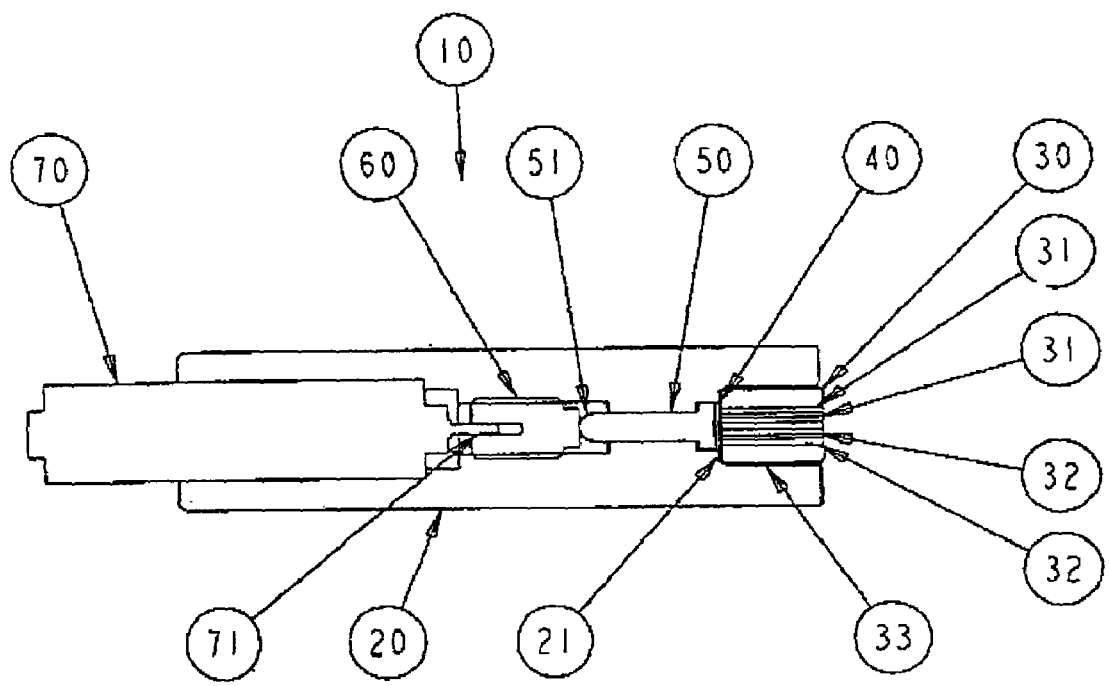
FIG. 2 is a representation of a cross section of a second embodiment of a high pressure miniature screw valve.

Referring to FIG. 2, an embodiment of a valve (10) is shown providing a threaded port screw (33) in the valve (10) body. The port screw (33) is fitted into the upper valve (20) to form a flange seal (21) on diaphragm membrane (40). Input port (31) and output port (32) are formed within port screw (33) to function as the lower valve section (30). A smooth interface on the port to seal surface may be more easily manufactured with the embodiment shown in FIG. 2.

Additional designs might include the use of several valve (10) bodies mounted to a common manifold plate, not shown.

Sealing Operation

The plunger (50) face diameter is sized such that a minimal amount of turning force is required on the screw (60) to sufficiently seal the port openings at full operating pressures. Full operating pressures for embodiments of the present invention can reach 750 psi. As understood by those skilled in the art, the maximum pressure such a diaphragm (40) is capable of withstanding is dependent upon design trade offs regarding materials, plunger and port sizing.

For example, embodiments of the valve (10) have been used with nitrous oxide having a porting cavity (plunger diameter) sized at 0.150 inches in diameter. The cross sectional area for this sized plunger is 0.018 square inches. The lifting force exerted on the membrane (40) is therefore 13.5 lbs.

The required torque exerted on the screw (60) to effect valve (10) closing may be calculated with the following equation: $T=KFd$ In an example design the valve screw (60) is a #10-32, which has a 0.165 pitch diameter (d) and a torque factor (K) of 0.2 giving a torque of 7-inch ounces to close the valve (10).

When the screw (60) is adjusted in the counter clockwise or "OPEN" direction high pressure from the fluid medium in input port (31) creates a force that lifts the membrane (40) off of the ports and opens the valve (10) allowing fluid to pass through inlet port (31) to output port (32).

In testing of prototype valves, it was determined that the port openings would sometime become plugged over time when a soft membrane (40) material such as Teflon or nitrile rubber was used. The material would extrude into either input port (31) or output port (32) sufficiently to prevent the fluid of input port (31) from providing enough pressure on membrane (40) to deflect the membrane (40) from lower valve body (30) thus preventing flow. As is well known in the art, when membrane (40) is engaged with the valve seat, the pressure from fluid in input port (31) is a function of the area or diameter of input port (31). A small diameter for input port (31) creates a small effective pressure on membrane (40) during direct contact; however, deflection of membrane (40) increases the effective pressurized area to the area of membrane (40) creating a much larger pressure on membrane (40). Plunger (50) provides a stabilization support for membrane (40) during this pressurized period of flow through the valve (10).

Figure 3:
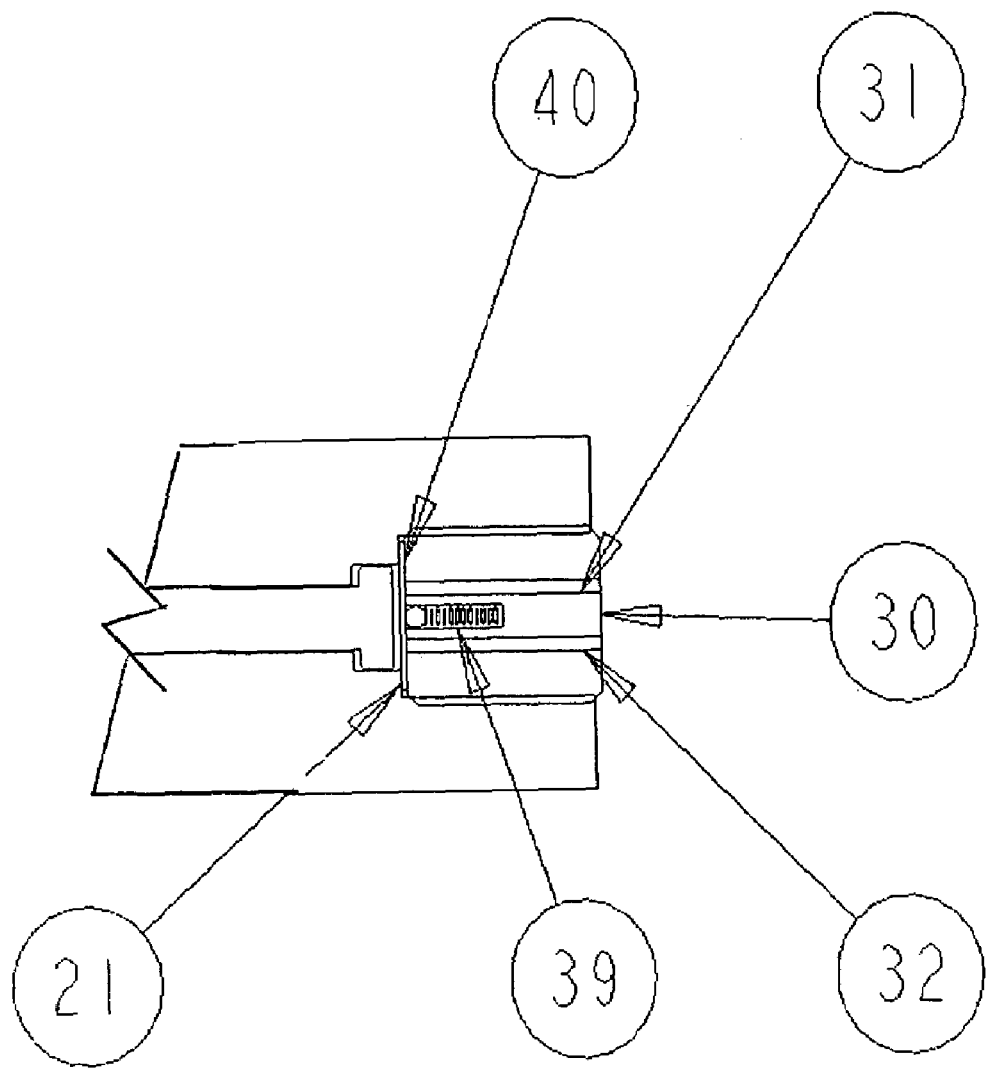
FIG. 3 is a representation of a partial cross section of an embodiment of a high pressure miniature screw valve having a poppet.

Referring to FIG. 3, a simple positive opening spring poppet (39) preferably placed between input port (31) and output port (32) can be supplied to provide positive pressure on membrane (40) to create an opening for pressure from input port (31) sufficient to start deflection of membrane (40) from the valve seat. As is well known in the art, any spring, or other force can be utilized to initiate deflection of membrane (40) from the valve seat to create a larger surface area for force from fluid through inlet valve (31) to create the pressure necessary to deflect membrane (40) from lower valve portion (30). Any such design feature can be utilized with valve (10) to prevent membrane (40) from sticking to the valve seat and restricting flow through the ports.

The plunger (50) also acts as a backing for the membrane (40). If the plunger (50) were allowed to be retracted past design limits the high-pressure force of the fluid would stretch the membrane (40) to failure or pull the outer sealed edges away from the flange (21). Limiting the plunger (50) retraction prevents this.

A commercially available miniature gear motor (70) (Micro Mo #0816) was interfaced with the valve screw (60) and used to operate the valves open and closed positions. A simple flat blade geometry on the motors output shaft (71) runs in a slot cut into the screw (60). This is similar to a flat blade screwdriver and screw. The loosely toleranced blade (71) is free to run laterally in the screw (60) cutout as the screw (60) travels up and down its limits.

A current of 100–200 mA at 6 volts for 250 ms (about 250 mJ total energy) is sufficient to operate the valve (10) in either direction. The valve (10) requires no power to hold in the open or closed position. This low energy consumption is important in mobile operations. A single AA cell battery could operate an embodiment of valve (10) over 20,000 times. The use of a gear motor (70) allows for throttling and flow control, however, other means of engaging the screw (60) with a rotary solenoid, memory wire, or hand operation is also possible.

The particular details, sizes, and equipment discussed above are cited merely to illustrate particular embodiments of the invention. It is contemplated that the use of the invention may involve elements having different characteristics. It is intended that the scope of the invention be defined by the claims appended hereto.

We claim:

1. A high pressure valve comprising:
a valve body having an upper portion and a lower portion, said lower portion of said valve body defining an inlet flow passage and an outlet flow passage traversing said valve body to a valve seat, said upper portion of said valve body defining a cavity at said valve seat,
a diaphragm within said cavity restricting flow between said upper portion of said valve body and said lower portion, said diaphragm capable of engaging said valve seat to restrict fluid communication between said inlet passage and said outlet passage,
a plunger within said cavity supporting
the entire surface area of said diaphragm within said cavity, said plunger being capable of engaging said diaphragm with said valve seat at said inlet and outlet fluid passages, said plunger being in point contact with
a drive screw having threads engaged with opposing threads within said upper portion of said valve body such engagement allowing motion of said drive screw within said valve body wherein said plunger has a convex surface contact with said drive screw.

2. The apparatus of claim 1 further comprising:
a motor capable of powering said drive screw.

3. The apparatus of claim 1 further comprising:
a second cavity between said inlet and outlet flow passages within said lower valve portion,
a spring within said second cavity providing a force upon a second plunger located within said second cavity providing a force upon said diaphragm to unseal said inlet flow passage upon retraction of said first plunger from said valve seat.

4. The apparatus of claim 1 wherein said upper and lower portions of said valve body are in threaded communication with each other.

5. The apparatus of claim 1 wherein said valve body defines more than two flow passages.

6. The apparatus of claim 1 wherein said cavity is a central bore within said upper portion of said valve.

7. The apparatus of claim 1 wherein said upper portion and said lower portion of said valve body engage to seal the circumference of said diaphragm.

8. The apparatus of claim 1 wherein said valve seat is polished to at least a sixteen micro inch surface finish.

9. A high pressure valve comprising:
- a valve body, having an inlet flow passage and an outlet flow passage traversing said valve body to a valve seat,
- a sealing means capable of engaging said valve seat to restrict fluid communication from said inlet passage and said outlet passage,
- a supporting means wherein said supporting means contacts the entire surface area of said sealing means, said sealing means covering said inlet and outlet fluid passages, said supporting means forcing said sealing means into engagement with said valve seat to cover said inlet and outlet fluid passage, said supporting means being in a torque reducing contact with
- a drive means for providing engagement of said support means with said valve seat wherein said supporting means has a convex surface contact with said drive means and
- a motor capable of powering said drive screw.

10. The apparatus of claim 9 further comprising:
- a cavity between said inlet and outlet flow passages,
- a spring within said cavity providing a force upon,
- a second plunger located within said cavity providing a force upon said sealing means to unseal said inlet flow passage upon retraction of said support means from said valve seat.

11. The apparatus of claim 9 wherein said valve body defines an upper and lower portion in threaded communication with each other.

12. The apparatus of claim 9 wherein said valve body defines more than two flow passages.

13. The apparatus of claim 11 wherein said sealing means resides within a central bore within said upper portion of said valve.

14. The apparatus of claim 11 wherein said upper portion and said lower portion of said valve body engage to seal the circumference of said sealing means.

15. The apparatus of claim 11 wherein said valve seat is polished to at least a sixteen micro inch surface finish.

* * * * *